No. 850,833. PATENTED APR. 16, 1907.
W. E. HEAL.
METHOD OF TREATING GLASS.
APPLICATION FILED APR. 5, 1906.
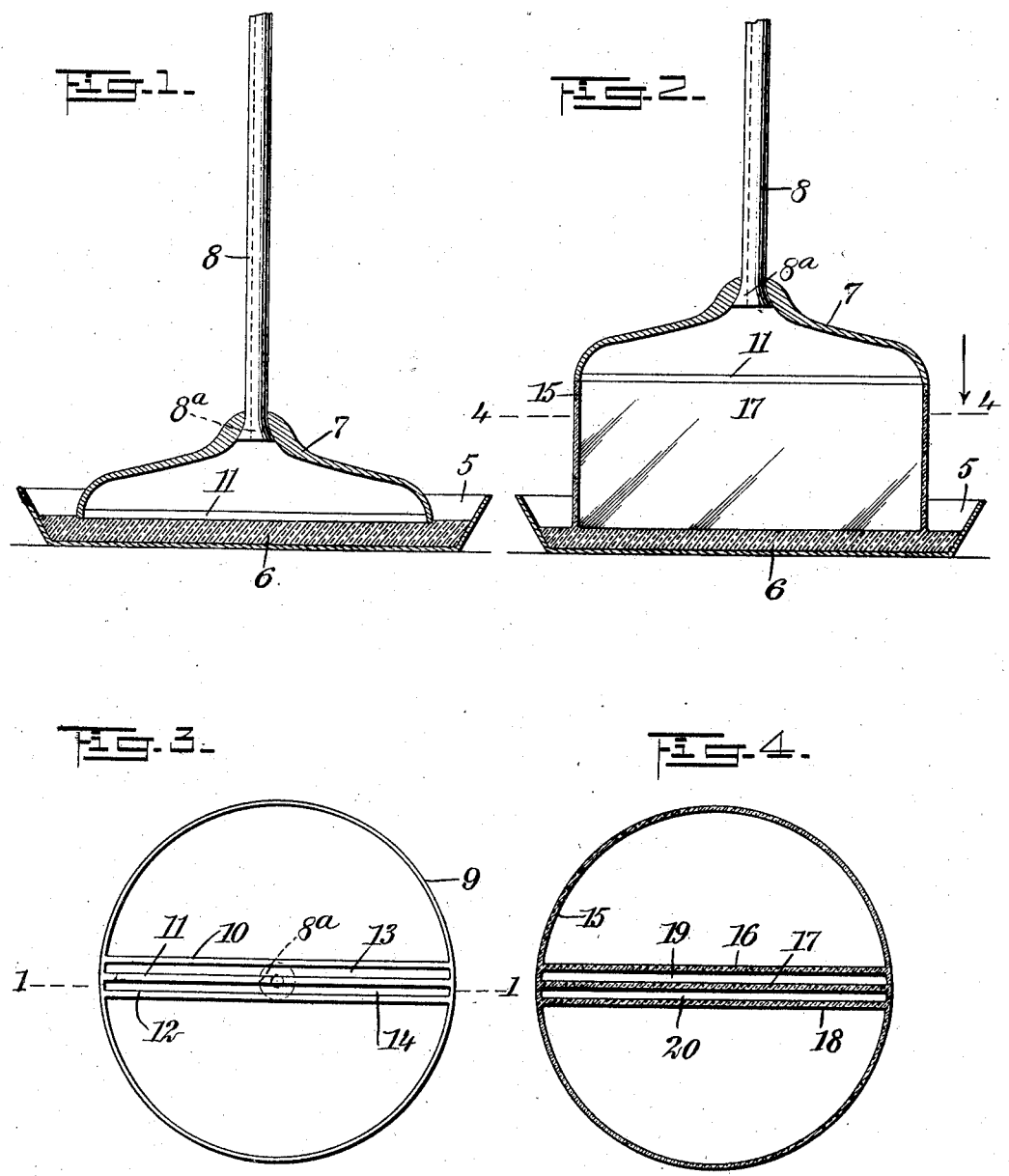

UNITED STATES PATENT OFFICE.

WILLIAM E. HEAL, OF COFFEYVILLE, KANSAS.

METHOD OF TREATING GLASS.

No. 850,833.

Specification of Letters Patent.

Patented April 16, 1907.

Application filed April 5, 1906. Serial No. 310,014.

*To all whom it may concern:*

Be it known that I, WILLIAM E. HEAL, a citizen of the United States, and a resident of Coffeyville, in the county of Montgomery and State of Kansas, have invented a new and Improved Method of Treating Glass, of which the following is a full, clear, and exact description.

My invention relates to a system for treating glass, my more particular object being to draw the glass into flat sheets suitable for commercial use and to enable the sheets to be made cheaply and yet be comparatively free from imperfections.

Reference is to be had to the accompanying drawings, forming a part of this specification, in which similar characters of reference indicate corresponding parts in all the figures.

Figure 1 is a vertical section on the line 1 1 of Fig. 3, showing one form of apparatus used for carrying out my improved method, the apparatus appearing at an initial stage of the operation. Fig. 2 is a view somewhat similar to Fig. 1, but showing the dome, hereinafter more fully described, as partially raised, so as to draw the glass. Fig. 3 is a plan of the grid located at the lower edge of the dome and used for lifting the molten glass; and Fig. 4 is a section upon the line 4 4 of Fig. 2 looking in the direction of the arrow and showing the glass cylinder containing the glass plates which are to be afterward separated therefrom.

A vessel 5 contains a quantity of fluid glass 6, to be made into plates. A dome 7 is mounted upon the lower end of a tube 8 and connected with the lower edge 9 of this dome 7, and extending directly across the same are a number of rods 10 11 12, separated by spaces 13 14. The lower end of the tube 8 is enlarged at 8ᵃ, so as to afford a better grip upon the dome 7.

The device is used as follows: The tube 8 is lowered until the lower edge 9 of the dome 7 and the bars 10 11 12 engage the surface of the molten glass 6. The tube 8 is now gradually raised and at the same time compressed air is forced downwardly through it. As the dome 7 is gradually raised from the upper surface of the molten glass 6 the molten glass, because of its adhesion, is drawn upwardly, as indicated in Fig. 2. A cylinder 15, of glass, is thus formed, and as the dome 7 is carried up the glass hardens, thus acquiring a definite thickness. The molten glass adhering to the bars 10 11 12 forms sheets 16 17 18, separated by spaces 19 20, as indicated in Fig. 4, the compressed air being supplied in a definite ratio relatively to the speed of ascent of the dome 7. The cylinder 15 is of uniform diameter throughout its entire length, and it may be drawn out to any length required. The cylinder containing the plates 16 17 18 is next separated from the molten glass 6 and from the dome 7, which may be done by cutting or breaking them away. The cylinder containing the glass plates is now annealed, after which the cylinder is removed and the glass plates cut into the shape required by commerce.

I am aware that efforts have heretofore been made to draw molten glass out into plates or sheets; but the efforts have not been successful. This is owing to the fact that when the molten glass is made to adhere to a surface which is gradually separated from the molten mass the plate or sheet tends to contract indefinitely and cannot ordinarily be maintained of uniform width. I avoid this by forming sheets adherent to the internal wall of a containing or enveloping closed cylinder of glass, which is maintained of uniform diameter by action of the air-pressure above described.

It will be noted that when the dome 7 is first raised from the molten mass the diameter of the glass cylinder is exactly the same as the greatest diameter of the dome. Raising the dome 7 would of course tend to cause the diameter of the glass cylinder to contract, especially at a point near the bottom, but this is avoided by the counterbalancing effect of the compressed air. The air-pressure is not carried to such a high degree as to cause the sides of the cylinder to bulge out, but merely to the degree necessary to preserve a symmetrical and uniform shape of the cylinder and of the glass plates.

Since any number of the bars 10 11 12 may be employed, it follows that any desired number of glass plates may be formed within the same cylinder and at the same time. It will also be noted that uniformity in the width of the sheets of glass is maintained, because the sheets adhere to the internal walls of the enveloping cylinder, which is of uniform diameter throughout. In other words, I have a method of supporting the edges of the sheets as drawn out gradually.

The cylinder by virtue of the action of the compressed air maintains its shape, and especially its lateral dimensions, so that the edges of every sheet are prevented from contracting or becoming distorted and are also prevented from warping.

Having thus described my invention, I claim as new and desire to secure by Letters Patent—

1. The method herein described of treating glass, which consists in drawing out said glass while in a molten state, so as to form a cylinder having sheets of glass extending across the same and separated from each other, and applying compressed air to maintain the shape and lateral dimensions of said cylinder and of said sheets of glass as the same are drawn out.

2. The method herein described of treating glass, which consists in bringing into contact with said glass while in a molten state, a member capable of adhering thereto, such member being closed upon itself so as to form a cylinder-like member of glass, said member being further provided with rods extending across it and capable of adhering to the molten glass so as to form sheets, gradually raising said member from the main body of said glass, and applying compressed air within said member so as to maintain the distention of said member of glass and thereby maintain the thickness and shape of the material being drawn out into sheets.

3. The method herein described of treating glass which consists in forming a closed member of molten glass, having a sheet of glass extending directly across said member, applying compressed air within said member for the purpose of maintaining said member and said sheet in a predetermined relation, and gradually separating said member from the main body of glass as said compressed air is applied.

4. The combination of a vessel for containing molten glass, a dome provided with rods for engaging said molten glass and capable of adhering thereto, means for separating said dome so as to draw out said molten glass, and means for applying compressed air within said dome.

5. As an article of manufacture, a tubular member adapted to transmit compressed air, and a dome connected with one end of said tubular member and provided with a plurality of bars capable of adhering to the surface of the molten glass.

6. The method herein described of treating glass, which consists in drawing out said glass while in a molten state so as to form a sheet adhesively connected at its edges with a body of glass drawn out at the same time, for the purpose of maintaining the lateral dimensions of said sheet, and allowing said glass to harden while said sheet is thus supported at its edges by said body of glass.

In testimony whereof I have signed my name to this specification in the presence of two subscribing witnesses.

WILLIAM E. HEAL.

Witnesses:
WALTER COLEMAN,
GEORGE M. GAMBLE.